(12) United States Patent
Beatty et al.

(10) Patent No.: US 7,672,934 B1
(45) Date of Patent: Mar. 2, 2010

(54) METHOD FOR RESTORING DOCUMENTS FROM A DATABASE FILE

(75) Inventors: Louis Beatty, Ormond, FL (US); Steven R. DeVos, Kirkland, WA (US)

(73) Assignee: Symantec Operting Corporation, Mountain View, CA (US)

( * ) Notice: Subject to any disclaimer, the term of this patent is extended or adjusted under 35 U.S.C. 154(b) by 349 days.

(21) Appl. No.: 11/551,018

(22) Filed: Oct. 19, 2006

(51) Int. Cl.
*G06F 17/30* (2006.01)
(52) U.S. Cl. ......................................... 707/3
(58) Field of Classification Search ........................ None
See application file for complete search history.

(56) References Cited

U.S. PATENT DOCUMENTS

| | | | |
|---|---|---|---|
| 6,115,704 A * | 9/2000 | Olson et al. .................... 707/3 |
| 7,107,298 B2 | 9/2006 | Prahlad et al. |
| 2003/0028494 A1 * | 2/2003 | King et al. .................... 705/71 |
| 2003/0093444 A1 * | 5/2003 | Huxoll ........................ 707/204 |
| 2004/0010487 A1 | 1/2004 | Prahlad et al. |
| 2005/0091233 A1 * | 4/2005 | Friske et al. ................. 707/100 |
| 2006/0053178 A1 | 3/2006 | van Ingen et al. |
| 2007/0185937 A1 | 8/2007 | Prahlad et al. |
| 2007/0185938 A1 | 8/2007 | Prahlad et al. |

OTHER PUBLICATIONS

Veritas, "Veritas NetBackup 5.1 for Oracle: System Administrator's Guide" (2004) Jul. 14, 2008 <http://seer.entsupport.symantec.com/docs/268100.htm>.*
Haq, Irfan. "Recovery Made Simple: Oracle Flashback Query." The Oracle FAQ. Oct. 10, 2004. Jun. 19, 2009 <http://www.orafaq.com/node/50>.*

* cited by examiner

*Primary Examiner*—Mohammad Ali
*Assistant Examiner*—Syed H Hasan
(74) *Attorney, Agent, or Firm*—Meyertons, Hood, Kivlin, Kowert & Goetzel, P.C.

(57) ABSTRACT

Various embodiments of a method and system for accessing an instance of a database file previously created by a secured RDBMS are disclosed. The secured RDBMS is not used to reconstruct tables and records from an unmounted backed up copy of a database file. During backup, a schema file including table and index information is stored along with the database file. During a subsequent restore operation, the schema file may be read for efficiently reconstructing objects from the database file, without having to reload or reinstall the secured RDBMS. For restoring or comparing objects from the backed up database file, a stored procedure in the secured RDBMS may be called.

16 Claims, 5 Drawing Sheets

METHOD FOR RESTORING DOCUMENTS FROM A DATABASE FILE

BACKGROUND OF THE INVENTION

1. Field of the Invention

This invention relates to the field of computer processing and, more particularly, to restoring electronic documents.

2. Description of the Related Art

As computer memory storage and data bandwidth increase, so does the amount and complexity of data that business and industry manage on a daily basis. A large portion of the data that must be managed in an enterprise involves electronic documents. Electronic documents may be managed for a company or workgroup by a dedicated server, which manages and stores both intra-office and external document transmissions.

This type of electronic document server is often configured as an enterprise information portal, which provides employees and customers the ability to search and access corporate information, including electronic documents. The enterprise information portal can serve as the single gateway to log into the corporate network and retrieve electronic documents. It is noted that enterprise information portals are typically secure and private (also known as intranet portals), but also may include external gateways for wider or even public access.

An enterprise information portal often includes a back-end database system, which may serve as the document management system. The back-end database system can store data in the form of electronic documents, metadata and other content associated with the portal, such as web pages. The back-end database in an enterprise information portal can be a variant of a stand-alone database system, which has been configured for document and content management.

Because electronic documents frequently contain crucial information, the contents of electronic document servers (e.g., an enterprise information portal along with its back-end database) may be archived, or backed up, to an archival storage to prevent loss or corruption of data. In particular, a back-end database is often backed up as a single database file, which contains all the tables, records, and indexing information for the database.

Thus it would be desirable to restore individual data objects from an unmounted database file, without having to reinstall the database system.

SUMMARY

Various embodiments of a system and method for restoring data from an unmounted copy of a relational database file are disclosed.

In one embodiment, the method comprises receiving a request to restore one or more data objects from said unmounted copy of said relational database file, wherein said relational database file was previously mounted by a secured RDBMS. A previously stored schema corresponding to the data structure of said relational database file is retrieved. The schema is used to retrieve said one or more data objects from said unmounted copy of said relational database file. The one or more data objects are provided to said secured RDBMS.

In another embodiment, using said schema to retrieve said one or more data objects from said unmounted copy of said relational database file includes using said data structure of said relational database file to access said unmounted copy of said relational database file, wherein said data structure includes information describing a user-defined table stored in said relational database file; and reconstructing the user-defined table, wherein at least some records associated with the user-defined table are also reconstructed, wherein said reconstructed records respectively correspond to data objects stored in said relational database file. In some embodiments, the method further includes selecting one or more reconstructed records from said reconstructed user-defined table, wherein said one or more reconstructed records correspond to said to be retrieved one or more data objects; reading information from said one or more reconstructed records for respectively retrieving said to be retrieved one or more data objects; and initiating retrieval of said to be retrieved one or more data objects from said unmounted copy of said relational database file.

In one embodiment, the method includes querying said data structure of said relational database file from said secured RDBMS; backing up said relational database file to said unmounted copy of said relational database file; and storing said data structure of said relational database file in said schema.

In yet another embodiment, providing said retrieved one or more data objects to said secured RDBMS includes transferring said retrieved one or more data objects to said secured RDBMS, wherein said retrieved one or more data objects are added to said relational database file. Specifically, said transferring may be performed as a continuous buffered operation, wherein said retrieved one or more data objects are reconstructed at the secured RDBMS.

In one embodiment, providing said retrieved one or more data objects to said secured RDBMS may include transferring said retrieved one or more data objects to said secured RDBMS, wherein said retrieved one or more data objects are compared to corresponding data objects in said relational database file.

In some embodiments, at least some of said one or more data objects each correspond to an electronic document, in which case, said secured RDBMS may be configured as a document management system. In one embodiment, said document management system includes an intranet portal for accessing documents, wherein said intranet portal is configured as a user of said secured RDBMS.

Other embodiments are also disclosed, such as a computer readable medium including program instructions executable to restore data from an unmounted copy of a relational database file according to the methods described herein. Another embodiment is represented by a computer system comprising a processor; and a memory storing program instructions executable by the processor to perform the methods described herein.

Figure 1:
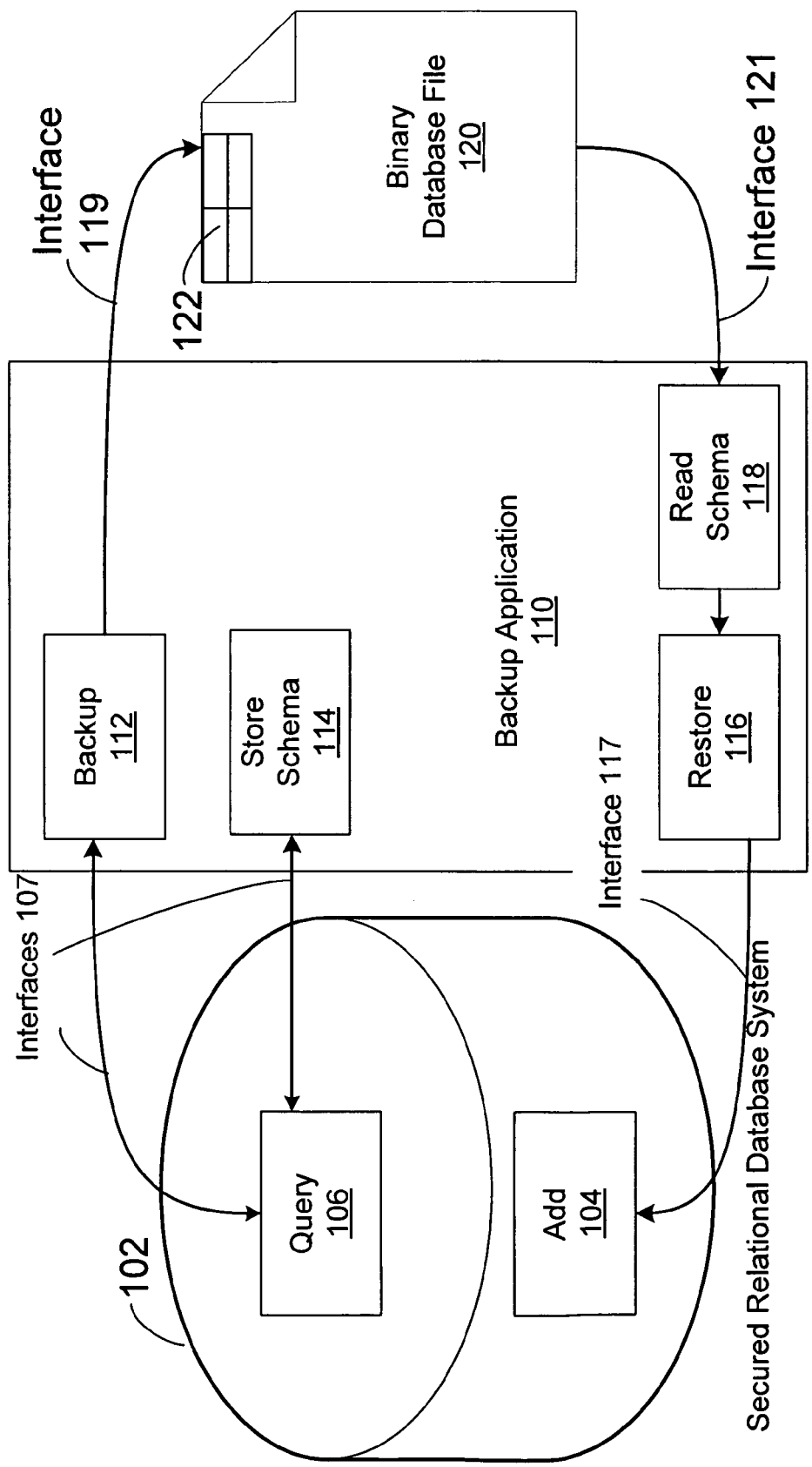
FIG. 1 is a block diagram of one embodiment of an archival system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

As used herein, "relational database management system" (RDBMS) shall refer to the executable code and program instructions for creating, storing and accessing one or more databases, and may include a file system and user interface components in various embodiments. A relational database conforms to the relational data model. In contrast, an object-oriented database represents information in the form of objects. RDBMSs are well known in the computer arts, some common examples including: Oracle (Oracle Corp.), MS-Access (Microsoft Corp.), SQL Server (Microsoft Corp.), Adaptive Server Anywhere (Sybase, Inc.), Informix (IBM Corp.), InterBase (Borland Software Corp.), Ingres (Ingres Corp.), MySQL (MySQL AB), MaxDB (SAP AG, MySQL AB), Apache Derby (Apache), etc. Furthermore, as used herein a "secured RDBMS" shall refer to an RDBMS that is configured to load and secure a database file (i.e., locking). It is noted that from the above list of RDBMSs, MS-Access is not a secured RDBMS because MS-Access does not support database locking.

Accordingly, a "mounted" or "locked" database file shall refer herein to a database file that has been loaded and secured. Thus, access to a mounted database file is performed via the secured RDBMS that has mounted the database file. After a database file has been mounted, it may be opened, i.e., brought online, for access via the secured RDBMS by authorized users and client systems. It is noted that a mounted database file may be inaccessible ("offline") if it is not yet open. A mounted database file is also referred to as a "started" database file. Thus, until a database file has been mounted, it cannot be accessed by a secured RDBMS.

In contrast, an "unmounted" database file refers to a database file that is not loaded and secured for access by a secured RDBMS. An unmounted database file may be accessed as a file according to user or file privileges, or other attributes, as defined by the file system in which it is stored. An example of an unmounted database file is a copy of a mounted database file. This copy is identical in content to the mounted database file, but cannot be accessed by the secured RDBMS that created the mounted database file. In some embodiments, a mounted database file is taken offline and then backed up to an unmounted copy. With this procedure, the state of the mounted database file does not change during the backup process, which results in an identical and consistent unmounted copy of the database file.

As referred to herein, a "file system" shall mean an information system which references and stores data, hierarchically organized in files and directories, in a volume created on a storage medium. The file system provides access to the data on the storage medium.

The term "record" as used herein shall refer to an entry in a relational database. A collection of associated records may be collectively described as a "table" in the database. A record may consist of one or more fields, which may serve as indexes (or keys) to other records in other tables. For example, in a document management database, each record in a document table may represent a document (or data object) stored in the database. In one embodiment, the document (data object) may be stored in the fields of the record itself. In some embodiments, the document (data object) is represented in a record by a reference to the document, such as a memory location.

As used herein, "schema" refers to the data structure of a mounted database file. Schema can include memory locations that define certain data structures within the database file, such as index pages, which will be described in detail below. Schema can be used to quickly and efficiently locate data structures and data objects in the database file, without having to perform extensive read and verification operations. Schema can be generated by querying a secured RDBMS in reference to a mounted database file at the moment a backup copy of the mounted database file is created. Since the mounted database file and the unmounted copy of the database file are identical, schema generated in this manner can be used to restore data objects from the unmounted database file, as will be discussed further herein.

Referring to FIG. 1, a block diagram of an archival system is illustrated in one embodiment. On the left side, a secured RDBMS 102 is illustrated, which represents both a relational database program and one or more actual databases implemented therein (not shown in FIG. 1). The relational database program refers to the executable commands, user interfaces and other program code for operating the secured RDBMS 102. The databases included in secured RDBMS 102 may further include various tables, indexes, relationships, queries, stored procedures, file systems, security layers, networking interfaces, etc., which are configured to operate on a plurality of data records, also referred to as records or entries, that constitute the "database." In relational databases, the records are arranged in tables (row and column arrangement). In addition, secured RDBMS 102 may create and modify a mounted database file (not shown in FIG. 1) for storing and accessing any given implementation of a relational database. In some embodiments, secured RDBMS 102 executes on a dedicated computing system that is configured for access by other server and client computers via a communications network.

In particular, secured RDBMS 102 is shown in FIG. 1 to include two functions, query 106 and add 104. These functions are shown as an example of functionality included within an RDBMS. In various embodiments, other kinds of functions, store procedures, or programs may be executed in an RDBMS. The query function 106 represents a function used to retrieve information from the secured RDBMS 102, whereas the add function 104 represents a function to store information in the secured RDBMS 102. It is noted that the query 106 and add 104 functions may operate on data related to the relational database program or on data from any of the databases implemented therewith in a given instance of secured RDBMS 102. The query function 106 may be accessed via interface 107, while the add function is shown with access via interface 117. The interfaces 107, 117 may include a local or remote network interface, and may also include network and/or software driver layers for communicating with secured RDBMS 102. In one embodiment, interfaces 107, 117 provide access to secured RDBMS 102 using SQL (Structured Query Language).

Also illustrated in FIG. 1 is backup application 110, which can be configured to perform a backup of the contents of a database from secured RDBMS 102. As will be discussed in detail below, backup application 110 can be configured to generate and store a schema of table and index information along with the backed up contents of a database in the unmounted database file 120. It is noted that the unmounted backed up database file 120 may be an identical instance of a mounted database file (not shown in FIG. 1) previously created by secured RDBMS 102. The schema may then be used to access or restore the contents of the database file 120, without using secured RDBMS 102.

Backup application 110 is operable to archive copies of electronic documents from secured RDBMS 102 on a backup medium such as removable storage (or any other type of archive storage). Alternatively, selected electronic documents may be transferred from secured RDBMS 102 to a remote archive storage through a network interface. In various embodiments, backup application 110 may also restore electronic documents or other data acquired from previous archive operations to secured RDBMS 102. Backup application 110 may also be configured to provide other known archiving functionality, as desired, such as various features provided by the Enterprise Vault™ or Backup Exec™ products from Veritas.

It is noted that in the embodiment illustrated in FIG. 1, backup application 110 includes a backup function 112. Backup function 112 may communicate with secured RDBMS 102 via interface 107 for selecting and retrieving content for archiving. In various embodiments, interfaces 107, 117 between backup application 110 and secured RDBMS 102 may include a network connection along with the necessary network and software drivers, as previously mentioned. The backup function 112 generates an unmounted backup copy database file 120, which may be stored on a storage medium separate from secured RDBMS 102 or in other appropriate locations. The unmounted database file 120 may be sequentially accessed by a file system on a storage medium.

Additionally, backup application 110 may further include a store schema function 114, which generates and stores schema for a relational database file. In some embodiments, the store schema function 114 may store the schema in a separate file (i.e., schema file). In other embodiments, schema may be stored within a section of database file 120. The data structure in schema may include specific memory addresses and other information for accessing the database structure stored within database file 120, without having to rely upon functions implemented in secured RDBMS 102. For example, schema may include the size of allocation units, information about a user-defined table, and other indexing information for the database file.

Additionally, backup application 110 may include a restore function 116, which can read specific documents from database file 120, and add them to secured RDBMS 102. The restore function may also include a means for selecting one or more documents for restoration. In one embodiment, a user interface for selecting and restoring documents is provided with the restore function 116.

Further in backup application 110, the restore function 116 may be preceded by the read schema function 118. In one embodiment, the read schema function 118 reads a schema file and reconstructs a user-defined table which indexes one or more records, or entries in the table. The read schema function 118 may thereby provide the restore function 116 all necessary information to reconstruct binary large objects (BLOBs), such as electronic documents, respectively associated with the records in the database file 120. In one embodiment, the user-defined table represents the main index of all electronic documents stored in database file 120, and includes information for reconstructing and accessing each of the stored electronic documents. It is further noted that although BLOBs have been described herein as electronic documents in various embodiments, the methods described herein are equally applicable to various kinds of data identified by the records of a user-defined table, including binary objects of various size and data stored in the fields of the record itself.

It is noted that in FIG. 1, backup application 110 accesses database file 120 via interfaces 119 and 121. Interfaces 119 and 121 represent file access by backup application 110 to a storage medium (not shown in FIG. 1), including a file system. In some embodiments, interfaces 119, 121 may include a network connection, for example to a remote storage medium. In one embodiment, interfaces 119, 121 represent storage access to a storage area network (SAN), which is a distributed, shared storage environment.

In one embodiment, database file 120 is a binary file that is sequentially accessed, using standard file I/O calls to the file system of the storage medium on which the file is stored. It is further noted that database file 120 may be structured in block units of memory, also referred to as pages or allocation units, 122. Depending on the type of secured RDBMS 102, the page size may be some multiple of bytes. In one embodiment, secured RDBMS 102 is an SQL Server (Microsoft Corp.) with a page size of 8 kilobytes (8,192 bytes). The internal references to memory addresses in the database file 120 may thus be given in units of pages.

Figure 2:
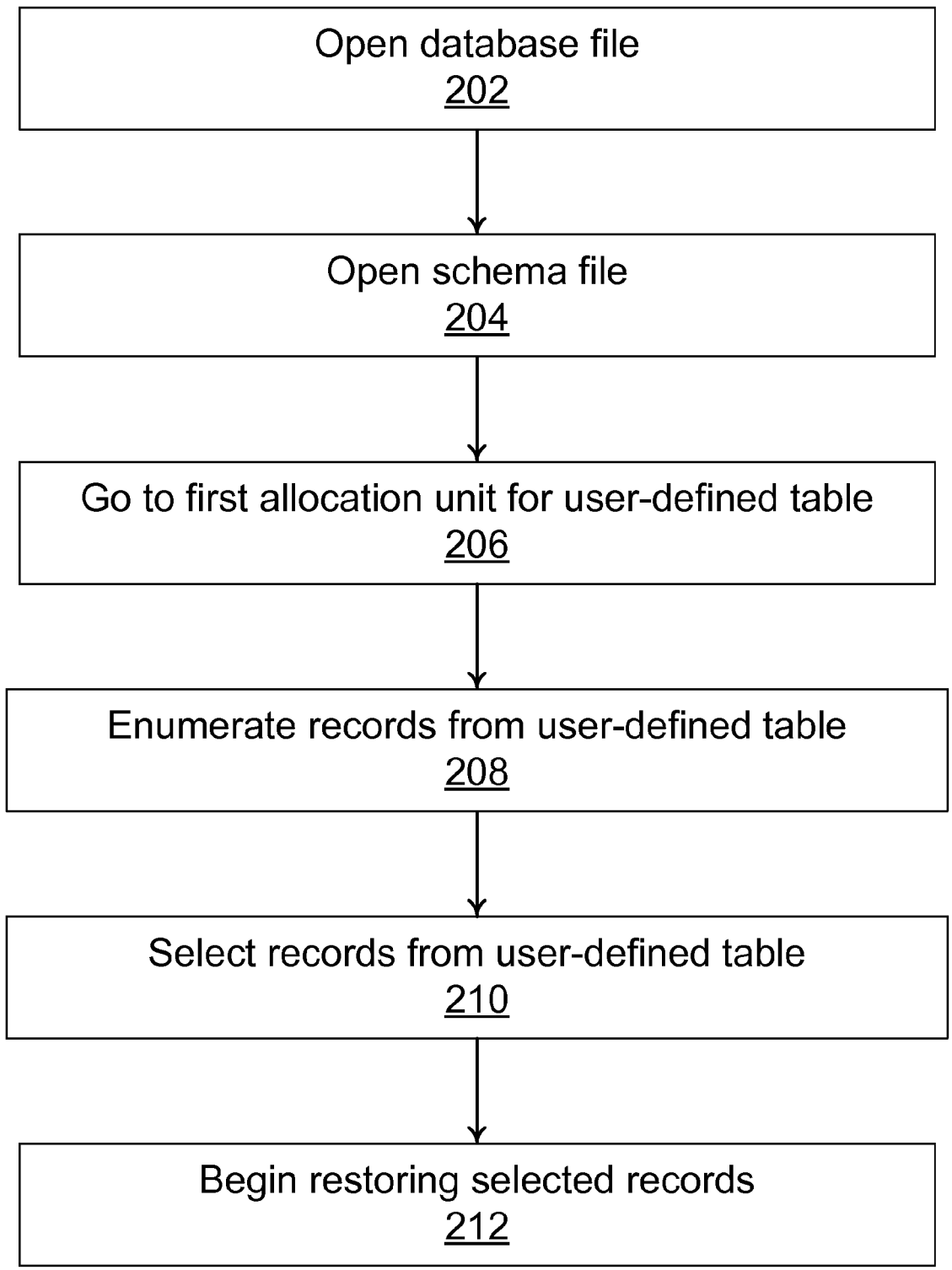
FIG. 2 illustrates one embodiment of a method for accessing archived documents.

Turning now to FIG. 2, one embodiment of a method for accessing a database file is illustrated. The method illustrated in FIG. 2 may be executed in one embodiment by backup application 110. In some embodiments, the read schema 118 function executes the process illustrated in FIG. 2. In step 202, the database file 120 is opened for reading. In one embodiment of step 202, a file open command is sent to the file system with parameters specifying the database file 120. The file open command may return a reference (or handle) for further accessing the file, for example by a read file or a close file function. In one embodiment of step 204, the schema file is opened in a similar manner to step 202. In another embodiment of step 204, wherein the schema file has been embedded with database file 120, the schema file is located and extracted.

In step 204 the contents of the schema file may be read and parsed. During step 204, the table and index information contained in the schema file is made available to backup application 110. In one embodiment, the table and index information includes all the allocation units for a user-defined table, which may include one or more records (i.e., entries). It is noted that a collection of one or more allocation units (i.e., pages) describing the memory location in a database file of all the objects in a table may also be referred to as an index allocation map (IAM). In one exemplary case, the user-defined table indexes records that represent electronic documents stored as BLOBs in the database.

It is further noted that in step 204, all the allocation units for the user-defined table may read by backup application 110 with minimal processing effort, and hence in a simple, yet efficient, manner. In various embodiments, step 204 does not require searching and analyzing the database file 120 to determine the allocation units for the user-defined table, because the table and index information has previously been stored in the schema file (see FIG. 4). In some embodiments, where a schema file is not available, an IAM for a user-defined table may alternatively be generated in step 204 by searching and analyzing the database file, thereby effectively reconstructing schema during the restore operation.

In step 206, the method proceeds by advancing to the first allocation unit for the user-defined table, also referred to as the index page for the table. It is noted that the location of the first allocation unit in database file 120 was identified in step 204. In one embodiment, a file read operation is configured to begin reading database file 120 at the location where the index page for the user-defined table begins. From the contents of this first allocation unit, subsequent allocation units and information about the user-defined table may be identified and read. It is further noted that in various embodiments, no additional information about the contents of the user-defined table, except the information provided in the schema file, is used to perform the method steps illustrated in FIG. 2, because the complete structure of the table, including all record and column information, can be located from the allocation units for the table.

In step 208, the records in the user-defined table are reconstructed. In other words, based on the table information in the database file that was located in step 206, the structure of the user-defined table may be reconstructed. Included in step 208 is the reconstruction of the record and column information about the user-defined table, and generating a list of the actual records stored in the table, at the time that database file 120 was created (i.e., backed up). In one embodiment, the records in the user-defined table each describe a particular electronic document stored in database file 120 and contain information for restoring each document individually. In one example, the information for restoring each document includes the memory location(s) in database file 120 where the BLOB(s) corresponding to the document are stored.

In step 210, a selection of one or more reconstructed records stored in the user-defined table may be performed. In one embodiment, a user interface is provided for manual selection of one or more records (i.e., electronic documents) stored in database file 120. In various embodiments, other methods of selection may be practiced in step 210. Once one or more records have been selected in step 210, the information for reading and reconstructing the data for each record has been located, as described previously in step 208. Subsequently, the restore process may be initiated in step 212 (see FIG. 3).

Figure 3:
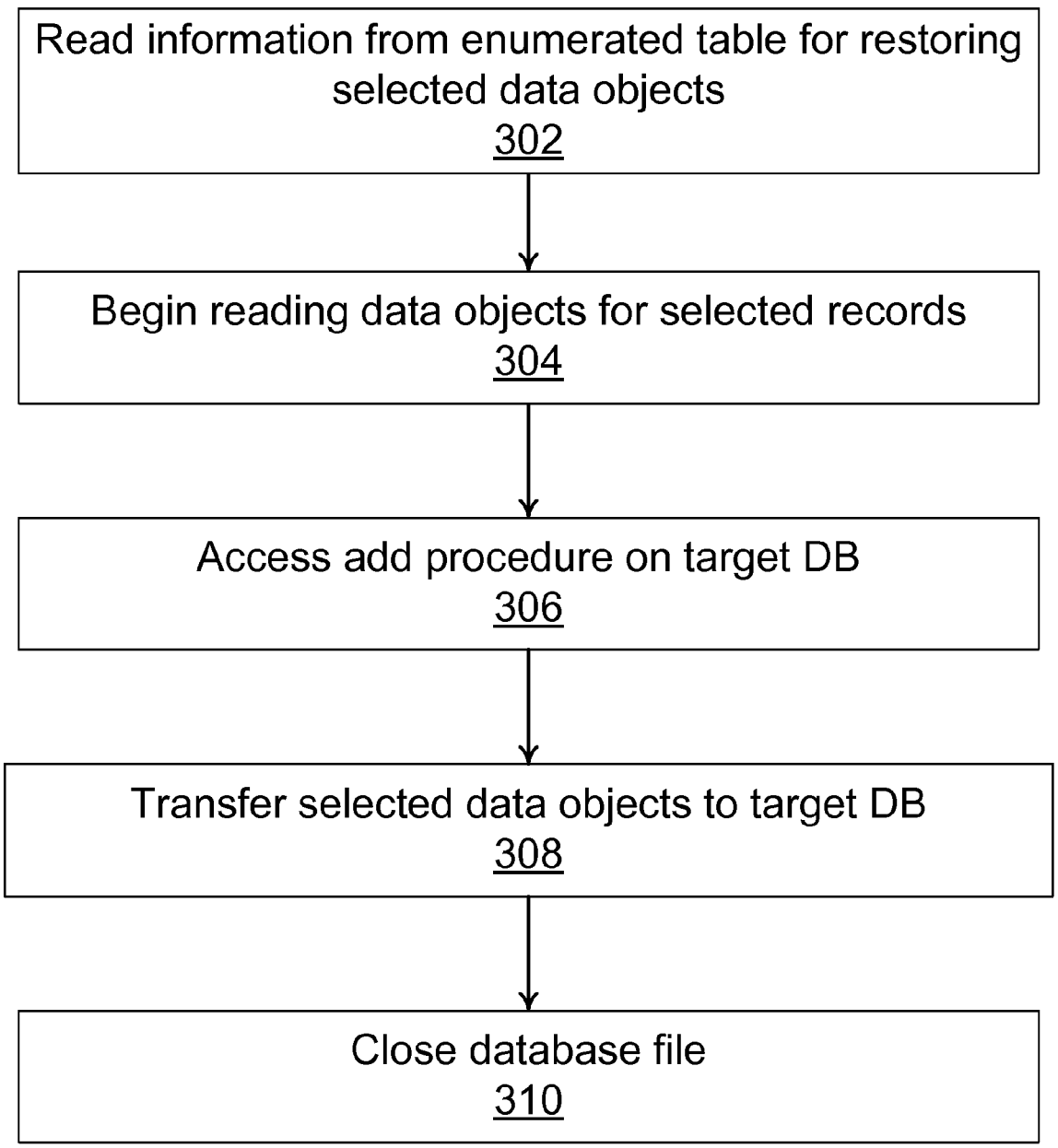
FIG. 3 illustrates one embodiment of a method for restoring electronic documents.

Referring now to FIG. 3, one embodiment of a process for restoring one or more records, including data objects associated with each record, from a database file 120 to a secured RDBMS 102 is illustrated. As mentioned above, the method illustrated in FIG. 3 may be initiated in step 212. The method illustrated in FIG. 3 may be executed in one embodiment by backup application 110. In some embodiments, the restore 116 function executes the process illustrated in FIG. 3. In one example, a plurality of records may be processed by the method illustrated in FIG. 3 in a sequential or in a looping manner. That is, steps 302-308 may be executed collectively for one or more records, or individually for one record and then repeated. Other combinations will be apparent to one of skill in the art in various embodiments.

In step 302, the information for restoring one or more records, along with their associated data objects, is read from the reconstructed user-defined table. In one instance, this information includes a list of memory addresses stored in each record, which correspond to the location(s) of a BLOB in database file 120. For example, in the case where a record represents an electronic document, the size of the document may vary. Depending on its size, the electronic document may be stored contiguously or may be segmented in separate memory blocks within database file 120. Thus, the record may actually store one or more locations in the database file 120, in which the contents of the data object are stored. In step 302, the memory addresses for reading data from database file 120 are thus identified and read.

In step 304, the data object (i.e., BLOB) corresponding to the selected record(s) is read from database file 120. The read operation is guided by the memory addresses identified in step 302. In one embodiment, the entire BLOB for each record is read at once in step 304. In some embodiments, a buffered transfer of data is initiated in step 302 by initiating the reading of records and their associated BLOBs.

In step 306, an add procedure 104 is accessed on the target secured RDBMS 102. This may involve logging in to the secured RDBMS 102 and securing access privileges for writing data. In some embodiments, the add procedure 104 involves replacing a particular record (i.e., add replace) along with its associated data objects. In other embodiments, the add procedure 104 is performed to introduce a record into the database that was not previously present (i.e., add new). It is noted that in some embodiments, step 306 may involve writing the entire data associated with a record to secured RDBMS 102 in a single operation. In other embodiments, step 306 includes initiating a buffered transfer of data using a stored procedure in secured RDBMS 102, wherein backup application 110 provides buffering capability.

In step 308, one or more selected records, along with their respective data objects, are transferred to secured RDBMS 102. In one example, steps 302-306 may be repeated for individual records in step 308. In some embodiments, a buffered transfer is initiated or sustained for one or more records in step 308, until all selected data for restoration has been written to secured RDBMS 102. Finally, in step 310, after the restore has been successfully completed, the database file 120 is closed. In various embodiments, step 310 includes closing the schema file concurrently.

It is noted that in various embodiments, the methods described in FIG. 3 are also used to perform a compare operation (instead of or along with a restore operation), for validating one or more records between backed up database file 120 and the active secured RDBMS 102. In this case, the add procedure 104 is replaced by a compare procedure, which accesses the corresponding record and compares the data for discrepancies. In various embodiments, a further procedure may mark data objects or records that could not be validated with the compare function. In one embodiment, after a compare, all marked records are restored again, until all records have been validated.

Figure 4:
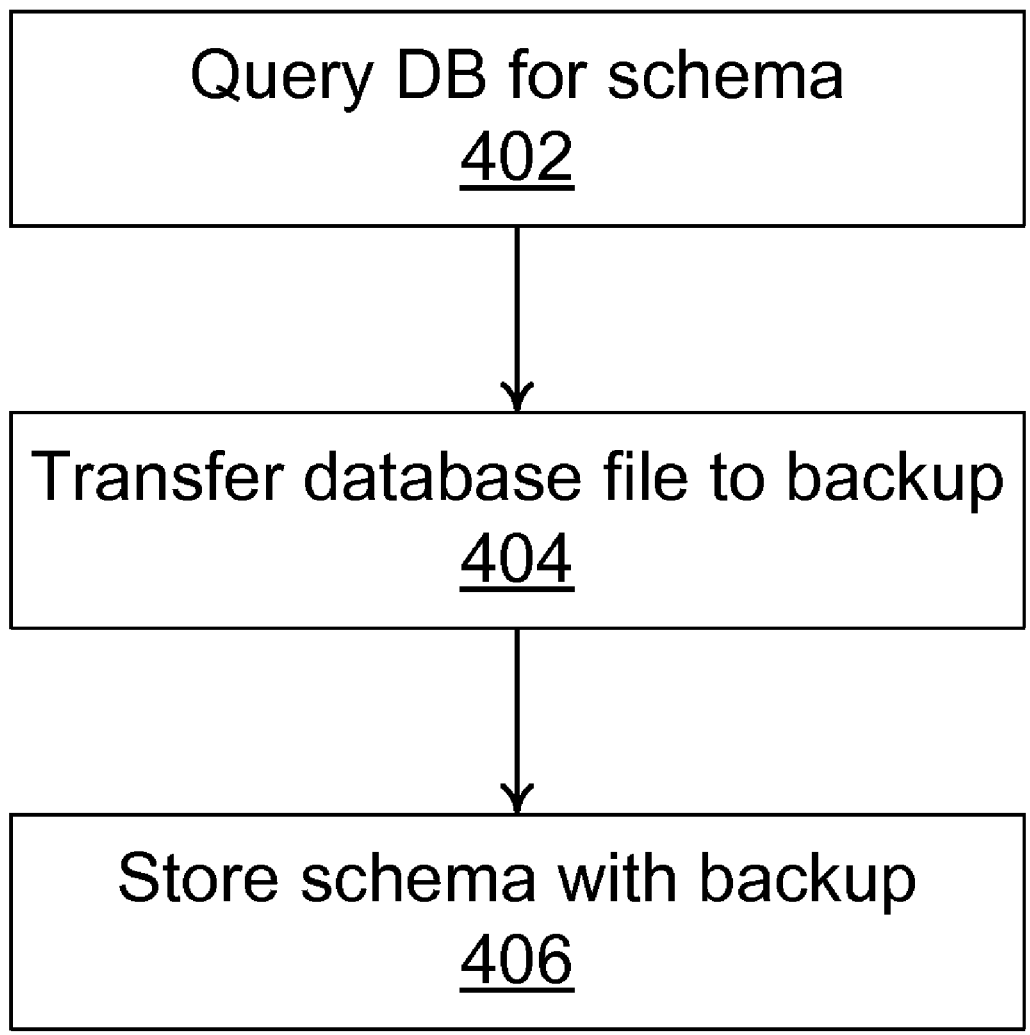
FIG. 4 illustrates one embodiment of a method for archiving electronic documents.

Referring now to FIG. 4, one embodiment of a method for querying a secured RDBMS 102 to generate schema is illustrated. It is noted that for a given database and schema file, the method illustrated in FIG. 4 is executed prior to the restore methods illustrated in FIGS. 2 and 3. As noted previously, this method provides the advantage of being quick and simple to execute, by using secured RDBMS 102 to generate schema when the backup is performed. At the moment the backup is performed, the query features of secured RDBMS 102 are available, and secured RDBMS 102 is also consistent with the backed up database file 120. In step 402, the database is queried for table and index information for a user-defined table. In one embodiment, the name of the table is known in step 402, and is used to reference the table in secured RDBMS 102. Once the table has been referenced, additional information about the table may be retrieved in subsequent queries, including table ID, IAM, and information about columns and records. This information is included in the schema file. In step 404, the backup of the secured RDBMS 102 to database file 120 may be performed. In step 406, the schema file is assembled, including information collected in step 402 and stored. As discussed previously, the schema file may be stored in a separate file, along with database file 120, or otherwise recorded by backup application 110 for subsequent retrieval. It is further noted that the steps shown in FIG. 4 may be performed in different arrangements with respect to order and parallel execution in various embodiments.

Figure 5:
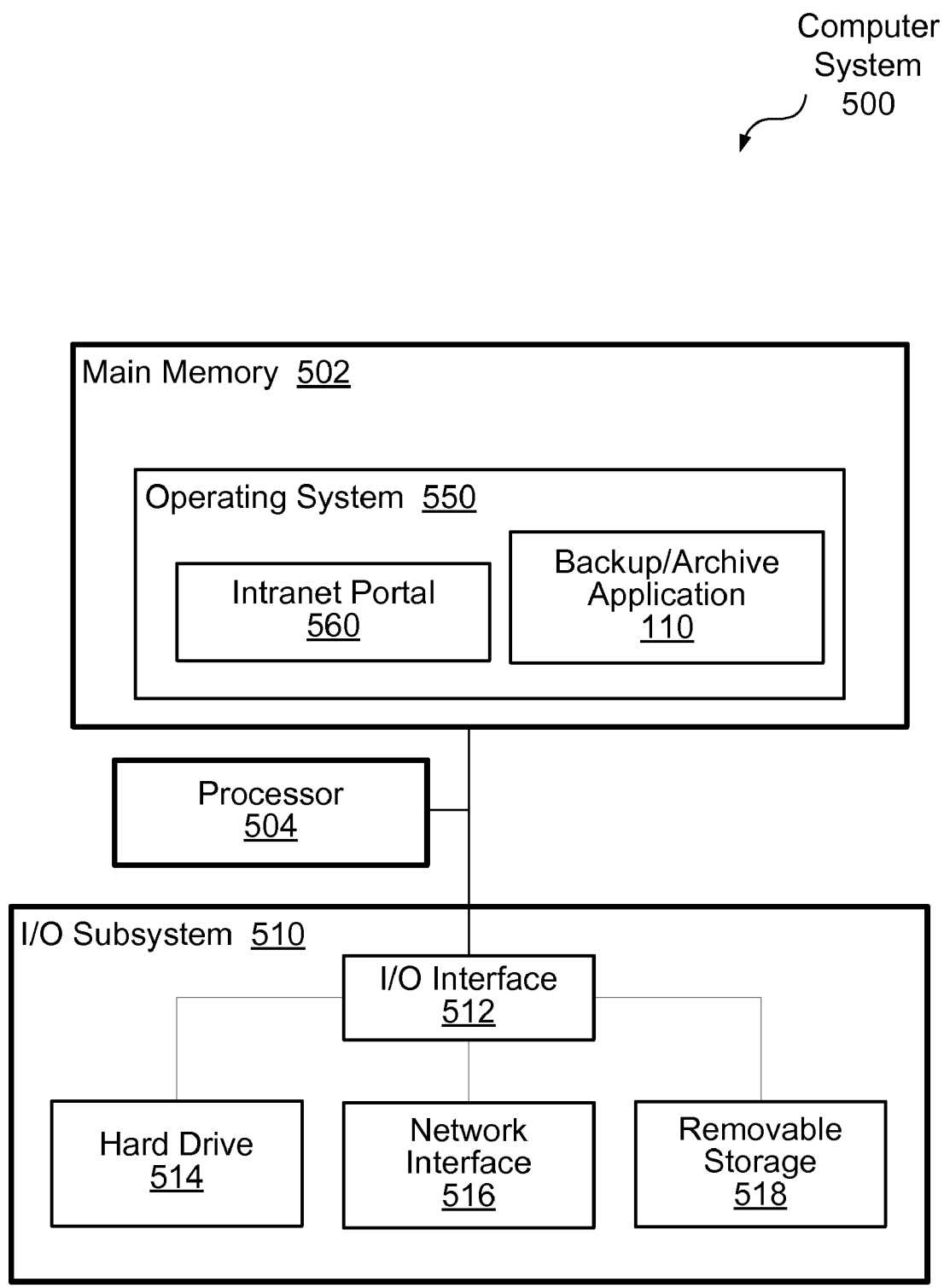
FIG. 5 is a block diagram of one embodiment of a computer system.

Turning now to FIG. 5, a block diagram of one embodiment of a computer system 500 is illustrated. Computer system 500 includes a processor 504 coupled to a main memory 502. Processor 504 and main memory 502 are in turn connected to an I/O subsystem 510, which comprises an I/O interface 512, a hard disk drive 514, a network interface 516, and a removable storage 518. Computer system 500 may be representative of a laptop, desktop, server, workstation, terminal, personal digital assistant (PDA) or any other type of computer system.

Processor 504 is representative of any of various types of processors such as an x86 processor, a PowerPC processor or a SPARC processor. Similarly, main memory 502 is representative of any of various types of memory, including DRAM, SRAM, EDO RAM, Rambus RAM, etc.

I/O interface 512 is operational to transfer data between processor 504 and/or main memory 502 and one or more internal or external components such as hard disk drive 514, network interface 516 and removable storage 518, as desired. For example, I/O interface 512 may embody a PCI bridge operable to transfer data from processor 504 and/or main memory 502 to one or more PCI devices. I/O interface 512 may additionally or alternatively provide an interface to devices of other types, such as SCSI devices and/or Fibre channel devices.

Hard disk drive 514 may be a non-volatile memory such as a magnetic media. Network interface 516 may be any type of network adapter, such as Ethernet, fiber optic, or coaxial adapters. Removable storage 518 is representative of a disk drive, optical media drive, tape drive, or other type of storage media, as desired.

In addition to the depicted hardware components, computer system 500 may additionally include various software components. For example, FIG. 5 illustrates an operating system 550 stored in main memory 502. Operating system 550 is representative of any of a variety of specific operating systems, such as, for example, Microsoft Windows, Linux, or Sun Solaris. As such, operating system 550 may be operable to provide various services to the end user and provide a software framework operable to support the execution of various programs such as Intranet Portal 560 and archive application 110 (also referred to as a backup application). It is noted that the depicted software components of FIG. 5 may be paged in and out of main memory 502 in a conventional manner from a storage medium such as hard drive 514.

In various embodiments, intranet portal 560 is operable to manage and maintain a plurality of electronic documents for a plurality of system users. In one particular implementation, intranet portal 560 is embodied by a Microsoft SharePoint Server or a similar enterprise information portal program. Intranet portal 560 may also include an encapsulated version of a secured RDBMS 102. In one embodiment, the internet portal 560 is configured to be the 'user' of secured RDBMS 102. In one specific implementation, secured RDBMS 102 is embodied by Microsoft SQL Server or a similar database server system. It is further noted that one or more client computers (not shown in FIG. 5) may be coupled via network to computer system 500. The client systems may access the intranet portal 560 centrally via one or more web pages, including access to secured RDBMS 102.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for restoring data, said method comprising:
 a computer system receiving a request to restore one or more data objects from an unmounted relational database file that is a backup copy of a mounted relational database file of a secured relation database management system (RDBMS);
 the computer system retrieving a previously stored schema corresponding to a data structure of said unmounted relational database file;
 the computer system using said schema to retrieve said one or more data objects from said unmounted relational database file, wherein said one or more data objects are retrieved without mounting the unmounted relational database file, and wherein said using includes:
  the computer system using said schema to access said unmounted relational database file, wherein said schema includes information describing a user-defined table stored in said unmounted relational database file;
  the computer system reconstructing the user-defined table including one or more records associated with the user-defined table, wherein said one or more reconstructed records respectively correspond to data objects stored in said unmounted relational database file;
  the computer system selecting one or more reconstructed records from said reconstructed user-defined table wherein said selected one or more reconstructed records correspond to said one or more data objects to be retrieved from said unmounted relational database file;
  the computer system initiating retrieval of said one or more data objects to be retrieved from said unmounted relational database file; and
 the computer system providing said retrieved one or more data objects to said secured RDBMS.

2. The method of claim 1, i further comprising:
 the computer system creating the backup copy of the mounted relational database file prior to receiving the request to restore said one or more data objects, wherein said creating includes:
  the computer system querying a data structure of said mounted relational database file from said secured RDBMS;
  the computer system backing up said mounted relational database file to said unmounted relational database file; and
  the computer system storing said data structure of said mounted relational database file in said schema.

3. The method of claim 1, wherein said providing said retrieved one or more data objects to said secured RDBMS includes:
 the computer system transferring said retrieved one or more data objects to said secured RDBMS, wherein said retrieved one or more data objects are added to said mounted relational database file.

4. The method of claim 3, wherein said transferring is performed as a continuous buffered operation, wherein said retrieved one or more data objects are reconstructed at the secured RDBMS.

5. The method of claim 1, wherein said providing said retrieved one or more data objects to said secured RDBMS includes:
 the computer system transferring said retrieved one or more data objects to said secured RDBMS, wherein said retrieved one or more data objects are compared to corresponding data objects in said mounted relational database file.

6. The method of claim 1, wherein at least one of said one or more data objects corresponds to an electronic document.

7. The method of claim 6, wherein said secured RDBMS is configured as a document management system.

8. The method of claim 7, wherein said document management system includes an intranet portal for accessing documents.

9. A computer-readable memory medium including program instructions executable by a computer system to:
receive a request to restore one or more data objects from an unmounted relational database file that is a backup copy of a mounted relational database file of a secured relation database management system (RDBMS);
retrieve a previously stored schema corresponding to a data structure of said unmounted relational database file;
use said schema to retrieve said one or more data objects from said unmounted relational database file without mounting the unmounted relational database file, wherein using said schema includes:
using said schema to access said unmounted relational database file, wherein said schema includes information describing a user-defined table stored in said unmounted relational database file;
reconstructing the user-defined table including one or more records associated with the user-defined table wherein said one or more reconstructed records respectively correspond to data objects stored in said unmounted relational database file;
selecting one or more reconstructed records from said reconstructed user-defined table wherein said one or more selected reconstructed records correspond to said one or more data objects to be retrieved from said unmounted relational database file; and
initiating retrieval of said one or more data objects to be retrieved from said unmounted relational database file; and
provide said retrieved one or more data objects to said secured RDBMS.

10. The memory medium of claim 9, including program instructions executable to:
create the backup copy of the mounted relational database file prior to receiving the request to restore said one or more data objects, wherein the program instructions executable to create the backup copy are executable to:
query a data structure of said mounted relational database file from said secured RDBMS;
backup said mounted relational database file to said unmounted relational database file; and
store said data structure of said mounted relational database file in said schema.

11. The memory medium of claim 9, wherein said program instructions executable to provide said retrieved one or more data objects to said secured RDBMS include program instructions executable to:
transfer said retrieved one or more data objects to said secured RDBMS, wherein said retrieved one or more data objects are added to said mounted relational database file.

12. The memory medium of claim 11, wherein transferring said retrieved one or more data objects is performed as a continuous buffered operation, wherein said retrieved one or more data objects are reconstructed at the secured RDBMS.

13. The memory medium of claim 9, wherein said program instructions executable to provide said retrieved one or more data objects to said secured RDBMS include program instructions executable to:
transfer said retrieved one or more data objects to said secured RDBMS, wherein said retrieved one or more data objects are compared to corresponding data objects in said mounted relational database file.

14. The memory medium of claim 9, wherein at least one of said one or more data objects corresponds to an electronic document, wherein said secured RDBMS is configured as a document management system.

15. The memory medium of claim 14, wherein said document management system includes an intranet portal for accessing documents.

16. A computer system comprising
a processor; and
a memory storing program instructions executable by the computer system to:
receive a request to restore one or more data objects from an unmounted relational database file that is a backup copy of a mounted relational database file of a secured relation database management system (RDBMS);
retrieve a previously stored schema corresponding to a data structure of said unmounted relational database file;
use said schema to retrieve said one or more data objects from said unmounted relational database file, wherein said one or more data objects are retrieved without mounting the unmounted relational database file, and wherein using said schema includes:
using said schema to access said unmounted relational database file, wherein said schema includes information describing a user-defined table stored in said unmounted relational database file;
reconstructing the user-defined table including one or more records associated with the user-defined table wherein said one or more reconstructed records respectively correspond to data objects stored in said unmounted relational database file;
selecting one or more reconstructed records from said reconstructed user-defined table, wherein said selected one or more reconstructed records correspond to said one or more data objects to be retrieved from said unmounted relational database file;
initiating retrieval of said one or more data objects to be retrieved from said unmounted relational database file; and
provide said retrieved one or more data objects to said secured RDBMS.

* * * * *